United States Patent [19]

Eden et al.

[11] Patent Number: 4,607,371
[45] Date of Patent: Aug. 19, 1986

[54] MULTI-WAVELENGTH METAL HALIDE LASERS

[75] Inventors: James G. Eden; Andrew W. McCown, both of Champaign; Marwood N. Ediger, Urbana; Dennis P. Greene, Champaign, all of Ill.

[73] Assignee: Board of Trustees, University of Illinois, Urbana, Ill.

[21] Appl. No.: 562,379

[22] Filed: Dec. 16, 1983

[51] Int. Cl.⁴ .......................... H01S 3/22; H01S 3/223
[52] U.S. Cl. ....................................... 372/56
[58] Field of Search ........................................ 372/56

[56] References Cited

U.S. PATENT DOCUMENTS

| | | | |
|---|---|---|---|
| 4,126,890 | 11/1978 | Fournier et al. | 372/56 |
| 4,168,475 | 9/1979 | Schimitschek et al. | 372/56 |
| 4,228,408 | 10/1980 | Schimitschek et al. | 372/56 |
| 4,229,711 | 10/1980 | Schimitschek et al. | 372/56 |
| 4,230,995 | 10/1980 | Burnham | 372/56 |
| 4,262,267 | 4/1981 | Schimitschek et al. | 372/56 |
| 4,423,510 | 12/1983 | Pack et al. | 372/56 |
| 4,505,876 | 3/1985 | Womack | 372/56 |

OTHER PUBLICATIONS

Chou, et al., "Laser Operation by Dissociation of Metal Complexes", J. of Applied Physics; vol. 47, No. 3; Mar. 1976; pp. 1055–1061.
Fahlen; *Self-Heated, Multiple-Metal-Vapor Laser;* IEEE J. of Quantum Electronics; Mar. 1976; pp. 200–201.

*Primary Examiner*—William L. Sikes
*Assistant Examiner*—Robert E. Wise
*Attorney, Agent, or Firm*—Philip Hill

[57] ABSTRACT

Unusual power enhancement and a plurality of output wavelengths in the visible or near-infrared regions are obtained simultaneously from a laser in which the vapors of two or more Group II-B metal halides are dissociatively excited either in an electrical discharge or by photodissociation by an external laser. By using halides involving only one metal and/or halogen isotope, the power output is greater than that obtainable with natural abundance salts. The laser output is also more confined spectrally. Over 50% of the power is contained in one or two spectrally narrow lines that are associated with a particular metal halide molecule.

20 Claims, 3 Drawing Figures

MULTI-WAVELENGTH METAL HALIDE LASERS

BACKGROUND OF THE INVENTION

This invention was made with Government support under contract 79-0138, awarded by the Air Force Office of Scientific Research, and under contract N 00014-82-K-0209, awarded by the Office of Naval Research. The Government has certain rights in this invention.

The discovery of laser beam systems and their utility for many purposes has been a recent and wide-ranging development. Among the various classes of laser systems, the dissociative lasers (in which the upper laser level is produced by rapidly dissociating a parent molecule) have proven to be particularly useful.

While dissociation lasers have been in existence for some time now, the last several years have witnessed the discovery of an unusually large number of these systems. Prior to this resurgence, there were surprisingly few molecular dissociation lasers which emit in the near-infrared, visible or ultraviolet. The cyanogen radical (CN), the I and Br atomic lasers[1] and the $C_2$ Swan-band laser were obvious exceptions. However, the demonstration and subsequent development of the atomic indium and HgBr blue-green dissociation lasers have vividly underscored several of the attractive features of the metal-halide dissociation lasers, in particular. Among them are:

1. The re-formation of the halide salt molecule following dissociation and lasing. In other words, the excitation process is cyclical.
2. The halide of a metal is frequently more volatile than the metal itself, thus permitting reduced temperature operation of the laser.
3. Since dissociative excitation pumps a continuum of repulsive electronic states, a monochromatic optical or electron source is not necessary (i.e., pumping can occur over a large energy interval while still producing the dissociative fragment in the same excited state). The dissociative mechanism is, therefore, potentially quite efficient.

First demonstrated in 1978 [E. J. Schimitschek and J. E. Celto, *Optics Letters*, volume 2, page 64 (1978)], the mercury bromide dissociation laser has been developed into one of the most powerful and efficient visible lasers known. Operating at 502 and 504 nm. in the blue-green region, this laser is excited by either photodissociating mercuric bromide vapor with vacuum ultraviolet radiation (optical wavelengths below 200 nm.) or by dissociating the dibromide in a transverse discharge. These developments are fully set forth in U.S. Pat. Nos. 4,168,475; 4,228,408; 4,229,711; and 4,230,995. The latter patent also deals with the mercury iodide and mercury chloride lasers which oscillate in the blue and yellow-green portions of the visible spectrum, respectively.

Improved efficiency, employing electric discharge lasers embodying specific isotopes of mercury and bromine, has been reported by Hanson et al. in *Applied Physics Letters*, volume 43(7), Oct. 1, 1983, pages 622–623.

Vaporization of mercury halides occurs at relatively low temperatures so that the laser tubes operate at temperatures ranging from 100° to 200° C. Lasers employing zinc or cadmium halides, including bromide and iodide, obtained both by photodissociation and by discharge pumping of the metal halide vapors at temperatures above 400° C., have been described by Eden and co-workers in *Applied Physics Letters* at volume 40(2), Jan. 15, 1982, pages 99–101; at volume 42(1), Jan. 1, 1983, pages 20–22, and at volume 43(5), Sept. 1, 1983, pages 418–420; as well as in *IEEE Journal of Quantum Electronics*, volume QE-19, no. 3, Mar. 1983, pages 263–266.

Despite these developments, there remains a need for improved metal-halide laser systems, particularly ones capable of operating at several widely-separated wavelengths in the visible or near-infrared simultaneously while, at the same time, providing spectrally narrow ("pure") output at each of the operating wavelengths.

SUMMARY OF THE INVENTION

This invention relates to pulsed lasers capable of simultaneously providing a plurality of output beams oscillating at discrete wavelengths in the visible and near-infrared portions of the spectrum. Not only is multiple output wavelength operation achieved, but the bulk of the output energy at each wavelength region is contained in a single narrow line. That is, the laser output is spectrally narrow.

This is accomplished by the dissociative excitation of a plurality of vaporized, metal halides wherein the metal moieties are selected from Group II-B of the Periodic Table of Elements. The excitation is achieved either by photo-dissociation or by dissociation of the desired metal-dihalide molecule in collisions with energetic electrons produced in a transverse discharge or by an electron beam generator.

This invention additionally relates to a pulsed laser in which power enhancement (relative to conventional metal-halide lasers) and spectral narrowing of the output is achieved by using isotopically pure metal-halide salts rather than their natural abundance counterparts.

This invention additionally relates to a pulsed laser system wherein laser action is obtained within a sealed enclosure, where cyclic recombination of metal halides occurs, or within an enclosed flowing system where vaporized metal dihalides are carried in a stream of inert buffer gas through the excitation zone and eventually deposited at a cooler, downstream site.

This invention additionally relates to the inclusion of hydrogen as the inert buffer gas, or as a component thereof, particularly for the zinc and cadmium halides.

The invention also relates to a discharge-pumped laser system wherein a minor proportion of free Group II-B metal is present in the enclosure together with a plurality of corresponding metal halides, to passivate the electrodes and thus improve laser life and efficiency.

This invention further relates to the use of gold or other chemically inert, yet electrically conducting, material to coat the discharge electrodes to prevent the diffusion of hydrogen from the electrodes into the laser volume.

The lasers of this invention provide unique multi-wavelength operation, affording narrow line width while simultaneously ranging from deep blue to the near infra-red spectral regions. These wavelengths are particularly useful in communications systems and also find use in the pumping of dye lasers on a pulsed basis.

DESCRIPTION OF THE INVENTION

Figure 1:
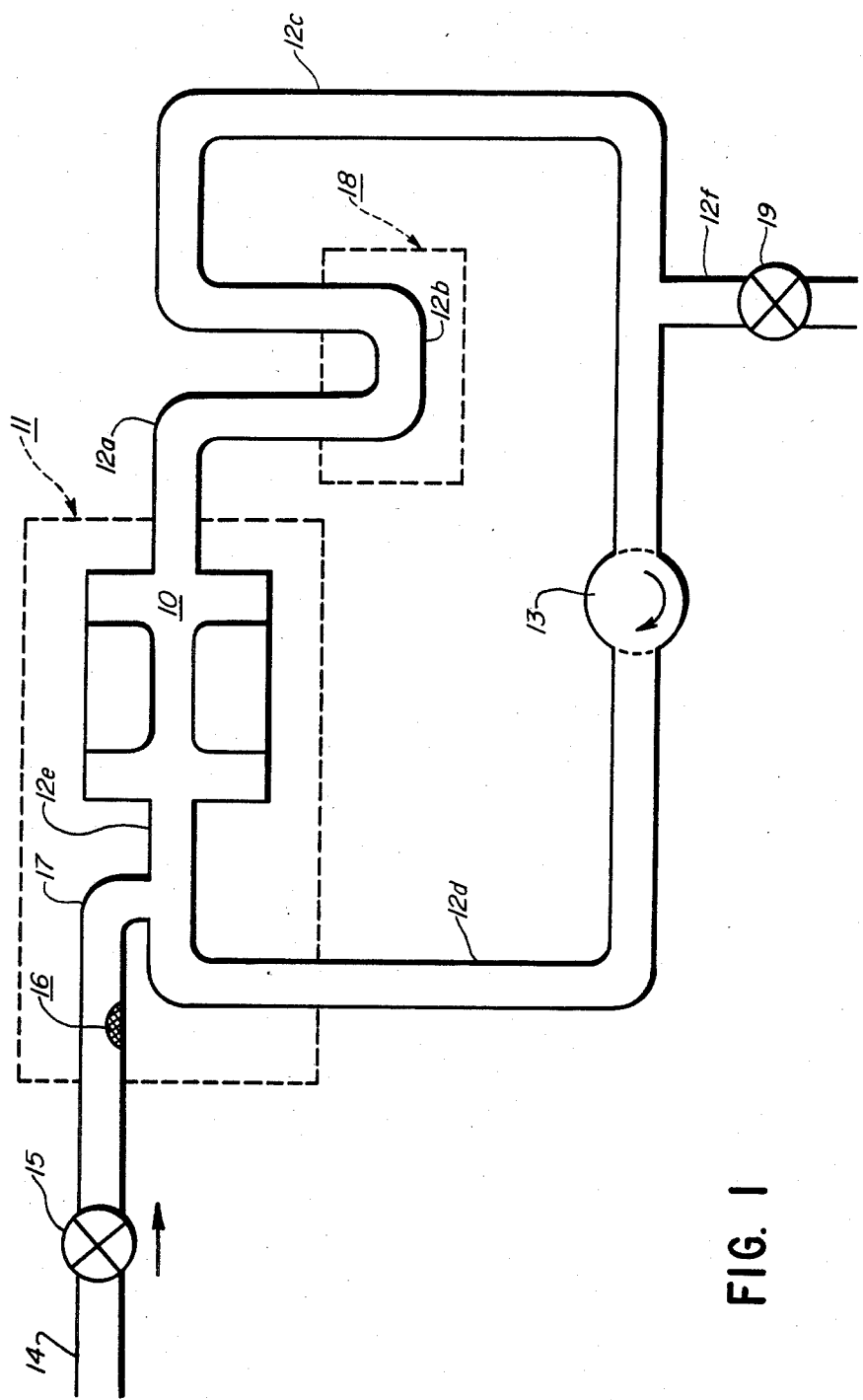
FIG. 1 presents a schematic view of the essential elements of a flowing laser system.

The pulsed lasers of this invention provide emitted laser energy at a plurality of wavelengths which are determined by the combination of Group II-B metal halides that is chosen. In this way, wavelengths extending from the deep blue (~440 nm.) to the near-infrared (~820 nm.) are obtainable. In the practice of this invention, multiple-wavelength outputs were first observed by simultaneously photodissociating CdBr (near-infrared) and CdI (red). Many such combinations are possible and discharge, rather than optical, excitation is the preferred mode for prospective commercial applications.

The pulsed laser system of this invention comprises at least the following:

(a) enclosure means;

(b) at least two Group II-B metal halides, present within said enclosure means;

(c) an inert buffer gas, present within said enclosure means;

(d) a heat source, for vaporization of said metal halides, capable of maintaining said enclosure means at a temperature of at least about 370° C.;

(e) a source of pulsed dissociative energy, located in proximity to said enclosure means and in communication therewith, for effecting dissociation of said vaporized metal halides;

(f) pre-ionization means, located in proximity to said enclosure means and in communication therewith, for effecting ionization of the vaporized metal halides in concert with and during said pulsed dissociation; and (g) an optical cavity disposed about said enclosure means, comprising a reflective surface and a partially reflective surface, each aligned parallel to one another so as to permit pulsed emission of a portion of said laser energy.

The enclosure means may be a relatively compact, sealed enclosure, thus providing a completely cyclic system wherein the particles recombine and are available for subsequent repetitive dissociations, responsive to the selected excitation means. Several unique characteristics of the II-B metal-halides make such operation possible. First, following dissociation of the molecule and radiation by the diatomic fragment MX, recombination of MX with a free halogen atom (X) occurs rapidly to reform the laser "fuel" $MX_2$. Hence, long-lived operation of the laser is possible, particularly when metal-halides, all having the same halogen atom (e.g., $HgI_2$ and $CdI_2$) are mixed. If halides having different halogen atoms, such as $HgBr_2$ and $CdI_2$, are mixed in a sealed system, it is likely that eventually the undesirable products, $HgI_2$ and $CdBr_2$, will also be present in the vapor mixture. Thus, sealed-off operation is particularly useful when the same halogen atom is present in each metal-halide molecule or if the same metal atom is used along with different halogen atoms (i.e., using $HgI_2$ and $HgBr_2$). A second characteristic of the Group II-B metal-halides is that the lasers operate over a wide range of metal-halide vapor pressures. Therefore, expensive measures to optimize or to equalize the partial pressures of each metal-halide constituent, while capable of improving overall performance, are not necessary.

In a second, equally suitable embodiment, the excitation occurs within an enclosure means characterized by having a zone wherein a flowing stream of vaporized metal halide is conducted in a stream of inert buffer gas, the enclosure means being essentially sealed except for provision for injection and removal of the gas stream. FIG. 1 presents a generalized diagram of one such embodiment. Such a system is desirable when employing halides involving different metal and halogen atoms.

The metal halides are selected from the metals of Group II-B of the Periodic Table of the Elements and the various halogens. The metal may be mercury, cadmium or zinc while the halide may be chloride, bromide or iodide.

With reference to FIG. 1, laser chamber 10 is situated within oven 11, maintained at a temperature within the range from about 100° to about 450° C., preferably from about 370° to about 450° C. The laser chamber is integral with continuous, sealed pipe means, including pipe sections 12a, 12b, 12c, blower 13, and pipe sections 12d and 12e, thus describing a cyclic flow system for inert gas and metal halide vapors. Inert buffer gas is introduced at system pressure, as required, through line 14 and valve 15. A supply of selected metal halides is deposited at vaporizing section 16, located in line 17, prior to initial sealing of the cyclic system. Buffer gas mixes with metal halide vapors and the mixture flows through lines 17 and 12e into the laser chamber where dissociation and lasing occurs. The buffer gas and reconstituted metal halide vapor then flow through lines 12a and 12b into cryogenic zone 18, maintained at cryogenic temperature, where the metal halide vapor is condensed and settled from the gas stream. The buffer gas stream is recycled through line 12c, blower 13 and line 12d, or alternatively discharged through line 12f and valve 19.

To minimize any operational problems attributable to recombination to yield an undesirable salt product, excitation may be conducted in a flowing enclosure means, as described above, where the recombined halides are condensed in a cooler zone downstream from the optical cavity and subsequently replaced by the correct dihalide.

The partial pressure of metal halide vapor within the enclosure should be within the range from about 0.1 to about 10 Torr. This concentration can be achieved at about 150° C. for mercury salts but temperatures ranging from about 370° to about 450° C. are necessary for vaporization of zinc and cadmium halides. Accordingly, the enclosure means should be associated with a heat source capable of reaching such temperatures. Conveniently, an oven is employed to provide most of the required heating. When the laser is operated at large pulse repetition rates, a substantial fraction of the necessary heating can be provided by the discharge itself.

The laser is pumped in the presence of an inert buffer gas, maintained within the enclosure means at a total pressure of at least 0.1 atmospheres. Typical pressures range from ~0.5 to 5 atmospheres at the lasing temperature. Inert buffer gases used in the art have included nitrogen and the rare gases, specifically, helium, neon, argon, krypton, xenon and radon. These gases are useful with the pulsed lasers of this invention, but we have found hydrogen to also be suitable in that it serves to raise the impedance of the discharge to match that of the driving circuit. Thus, efficient energy transfer between the storage circuitry and the lasing volume can be made.

Hydrogen is a useful constituent in the buffer gas mixture, particularly for the zinc and cadmium halides. The presence of hydrogen in the laser discharge where mercury halides have been employed can lead to hydride formation at the electrode surface. These hydrides absorb strongly in the blue and blue-green portions of the spectrum. Generally, in the practice of this invention any of these enumerated gases may be employed as well as mixtures of them. A preferred buffer gas comprises approximately equimolar parts of helium and hydrogen.

Because of the deleterious effects of mercury hydride molecules on laser performance, stainless steel surfaces for the discharge electrodes should be avoided. Hydrogen is trapped in the metal during manufacturing and is slowly released when heated. Therefore, the electrodes should desirably be plated with gold or another chemically inert but electrically conducting metal such as platinum. An alternative course is to avoid stainless steel entirely and use nickel, monel, or inconel electrodes.

The required source of pulsed energy may be either another laser (for photodissociation) or a source of pulsed electrical power. In the latter instance, the source is a discharge apparatus having two electrodes in contact with the enclosure means. When desired, a minor proportion of free group II metal may be present when discharge excitation is employed in order to passivate the electrode.

The optical cavity employed with the lasers of this invention is conventional in design. One reflective surface is partially reflective so that only a fraction of the beam in the optical cavity is actually transmitted by the mirror and available as useful power. The other mirror will generally be a high reflector at the laser wavelength(s). Because multiple output wavelengths are produced by this invention, the coatings on each mirror must be broadband.

The system of this invention permits a choice of multiple output wavelengths, determined by the choice of group II-B metal halides. The variety of wavelengths thus made available is set forth in Table I.

TABLE I

| Output Wavelengths of Group II-B Metal Halides | | | |
|---|---|---|---|
| Salt | Dissociated Specie | Spectral Region | Wave Length (nm) |
| $HgCl_2$ | Hg Cl | yellow-green | 557 |
| $HgBr_2$ | Hg Br | blue-green | 502 |
| $HgI_2$ | Hg I | violet | 440 |
| $ZnCl_2$ | Zn Cl | near-infrared | 820 |
| $ZnBr_2$ | Zb Br | near-infrared | 830 |
| $ZnI_2$ | Zn I | orange | 602 |
| $CdCl_2$ | Cd Cl | near-infrared | 850 |
| $CdBr_2$ | Cd Br | near-infrared | 811 |
| $CdI_2$ | Cd I | red | 655 |

Note that, for example, a white light laser could be obtained by combining the red ($CdI_2$), green ($HgCl_2$) and blue ($HgI_2$) wavelengths with the flowing system of FIG. 1.

The broad range of output wavelengths available makes these lasers particularly useful for communications or power transmission applications. Perhaps more importantly, they make excellent pumps for pulsed dye lasers in the visible. A good dye laser pump requires that its wavelength lie near where the dye laser is expected to operate. The only pumps currently available for pulsed dye lasers, however, are $N_2$ (337 nm) and the excimer lasers. Neither lies in the visible region and so they are inefficient when pumping, for example, yellow, red, or near-infrared dyes. The lasers of this invention can be expected to be much more efficient pump sources when the dye laser wavelength is greater than approximately 550 nm.

The following examples are illustrative, without limitation, of the pulsed lasers of this invention.

EXAMPLE I

An optical cell, constructed conventionally from Suprasil quartz tubing and 2.5 cm. diameter flats, was loaded with about 3 mg. each of reagent grade cadmium bromide and cadmium iodide. The cell was degassed at less than $5 \times 10^{-6}$ Torr employing a hydrogen torch. The cell was then loaded with research grade argon gas to a pressure of 100 Torr. at 20° C. and sealed off. The cell was then heated in an oven to about 430° C. and transversely irradiated over a length of 6 cm. by an ArF laser operated at 20 Hz. The laser and fluorescence spectra were acquired by a 0.6 m. Hilger-Erigas spectrograph coupled to a Tracor-Northern multichannel spectral analyzer.

Employing a broad band optical cavity, with photodissociation at 193 nm., lasing was observed at both 655 nm. (Cd I) and 811 nm. (Cd Br).

EXAMPLE II

A discharge cell having an active length of 50 cm. was fitted with electropolished, stainless steel electrodes constructed of 1 cm. diameter (1 mm. wall thickness) tubing, having the ends of the electrodes curved away from the discharge axis. Eight nickel electrical feedthroughs also provided mechanical support for each electrode and the anode-cathode gap was adjusted to 1.6 cm. A preionizer was made by encapsulating two tungsten wires (1-mm. and 3-mm. diameter, collinear) in uranium glass. An eleven-spark linear array was then formed by cutting equally spaced, ~0.6-mm. spark gaps in the thin tungsten wire and notching away the glass to form V-shaped grooves around each gap. Additional feedthroughs were connected to each end of the rod to hold the preionizer parallel to and 2 cm. from both electrodes. The preionizer and electrodes were then sealed within a 7-cm. diam Pyrex tube and re-entrant quartz windows were installed at Brewster's angle.

A simple LC circuit, consisting of dc-charged $BaTiO_3$ doorknob capacitors and a Maxwell 50-kV spark gap switch, drove the main discharge.

A preionizer was powered by a HY32 hydrogen thyratron operating at 15 kV which produced a peak current of 1200 A and a pulse width of 2.7-$\mu$s full width at half-maximum (FWHM). The best discharge quality was obtained by triggering the main discharge at the peak of the preionizer current pulse. The wide preionizer current pulse provided a continuous source of weak background ionization throughout the main discharge which was important in stabilizing the discharge in the presence of attaching molecules.

This discharge cell was placed in a firebrick oven and successfully operated at temperatures as high as 440° C. Alumel-chromel thermocouples monitored the oven temperature. Several milligrams of natural abundance $CdI_2$ were loaded into a Pyrex sidearm and distilled into the discharge tube by heating with a hydrogen torch. The vial was then sealed off and the halide salt further degassed under vacuum by heating the cell to 200° C. for 1 hour. Research grade He and $N_2$ were used.

Figure 2:
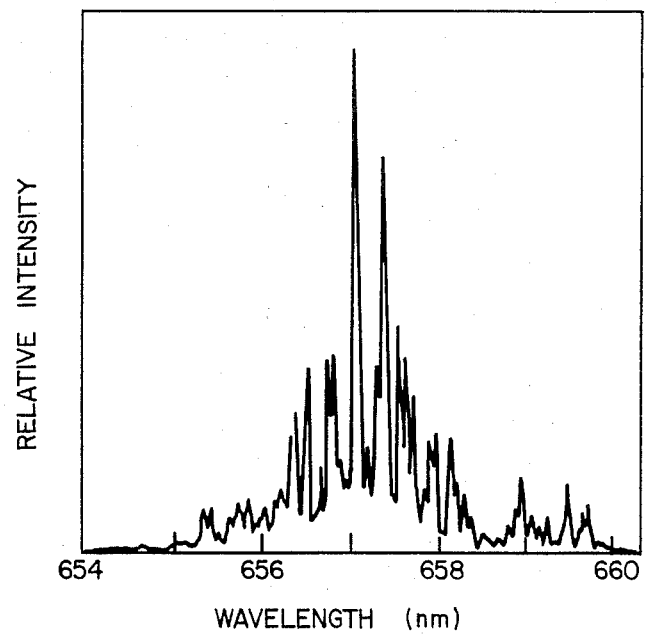
FIGS. 2 and 3 present spectra illustrating the improvement in spectral purity obtained when using a single isotope of either or both of the metal and halogen components of a Group II-B metal halide.

The laser spectrum is presented in FIG. 2, showing a distribution between more than 15 strong lines between 656 and 658 nm.

EXAMPLE III

Figure 3:
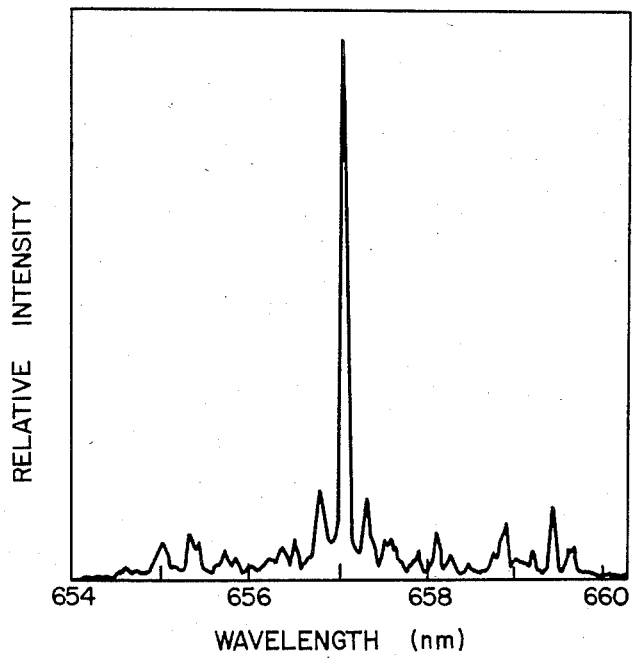

The procedure of Example II was repeated employing $^{114}CdI_2$. The spectral data are shown in FIG. 3 where over 50% of the total laser energy is contained in a single line at 657.1 nm.

EXAMPLE IV

The procedure of Example I was repeated, employing separately $^{200}HgBr_2^{81}$, $^{64}ZnI_2$ and $^{114}CdI_2$ as well as the corresponding natural abundance salts. Output energy enhancements for the single isotope species were 15%, 100%, and 400%, respectively.

EXAMPLE V

The procedure of Example III was repeated employing natural abundance $CdI_2$. In comparison, the single isotope species (Example III) exhibited a power (efficiency) enhancement of 6%.

We claim:

1. A pulsed laser, emitting energy at a plurality of selected, characteristic wavelengths within the visible and near infra-red regions of the spectrum, by dissociation of a plurality of selected metal dihalides, comprising:
   (a) enclosure means;
   (b) at least two metal halides from group II-B of the Periodic Table, present within said enclosure means;
   (c) an inert buffer gas, present within said enclosure means;
   (d) a heat source, for vaporization of said metal halides, capable of maintaining said enclosure means at a temperature of at least about 370° C.;
   (e) a source of pulsed dissociative energy, located in proximity to said enclosure means and in communication therewith, for effecting dissociation of said vaporized metal halides;
   (f) pre-ionization means, located in proximity to said enclosure means and in communication therewith, for effecting ionization of the vaporized metal halides in concert with and during said pulsed dissociation; and
   (g) an optical cavity disposed about said enclosure means, comprising a reflective surface and a partially reflective surface, each aligned to permit pulsed emission of a portion of said laser energy.

2. The pulsed laser of claim 1, having a sealed enclosure means.

3. The pulsed laser of claim 2 wherein the group II-B metal halides are zinc iodide and cadmium iodide.

4. The pulsed laser of claim 1, having enclosure means wherein a uniform stream of vaporized metal halides in inert buffer gas flows therethrough.

5. The pulsed laser of claim 4 wherein the group II-B metal halides are mercury bromide and mercury iodide.

6. The pulsed laser of claim 1 wherein one or more of the group II-B metal halide components consists substantially of a single metal or halogen isotope.

7. The pulsed laser of claim 1 wherein the inert buffer gas is selected from the class consisting of helium, neon, argon, krypton, xenon, radon, nitrogen, hydrogen, and mixtures thereof.

8. The pulsed laser of claim 7 wherein the inert buffer gas is a substantially equimolar mixture of helium and hydrogen.

9. The pulsed laser of claim 1 wherein the heat source is capable of maintaining a temperature within the range from about 370° to about 450° C.

10. The pulsed laser of claim 1 wherein the source of dissociative energy comprises photons from an external laser.

11. The pulsed laser of claim 1 wherein the source of dissociative energy comprises electrons derived from a discharge apparatus.

12. The pulsed laser of claim 11 wherein there is present, together with the metal halides from group II-B in the enclosure means, a minor proportion of free group II-B metals corresponding to the metals of the metal halides.

13. The pulsed laser of claim 11 wherein the discharge apparatus includes electrodes plated with a substantially chemically inert and electrically conducting material.

14. The pulsed laser of claim 13 wherein the plating material is gold or platinum.

15. The pulsed laser of claim 11 wherein the discharge apparatus includes electrodes comprising nickel.

16. The pulsed laser of claim 1 wherein the partial pressure of each of the group II-B metal halides is within the range from about 0.1 to about 10 Torr.

17. The pulsed laser of claim 1 wherein the total pressure maintained within the enclosure means is within the range from about 0.1 to about 5 atmospheres.

18. A pulsed laser, for emission of energy by metal halide dissociation and comprising enclosure means, sources for heat and pulsed dissociation energy, and an optical cavity disposed about said enclosure means and capable of permitting pulsed emission of a portion of said laser energy, having at least two metal halides from Group II-B of the Periodic Table present within said enclosure means, and emitting energy at a plurality of selected, characteristic wavelengths within the visible and near infra-red regions of the spectrum.

19. The pulsed laser of claim 18 wherein a uniform stream of vaporized metal halides in inert buffer gas flows through the enclosure means.

20. The pulsed laser of claim 18 wherein the heat-source maintains said enclosure means at a temperature of at least about 370° C.

* * * * *